US008109829B1

(12) United States Patent
Morgan et al.

(10) Patent No.: US 8,109,829 B1

(45) Date of Patent: Feb. 7, 2012

(54) COMPOSITING DEVICE FOR COMBINING VISUAL CONTENT

(75) Inventors: Richard Morgan, Delta (CA); John Paul Mendocha, Colton, CA (US); Steve Gourley, Nepean (CA); Peter Simmons, Carlsbad, CA (US)

(73) Assignee: Acme Embedded Solutions Inc., Reno, NV (US)

( * ) Notice: Subject to any disclaimer, the term of this patent is extended or adjusted under 35 U.S.C. 154(b) by 592 days.

(21) Appl. No.: 12/327,558

(22) Filed: Dec. 3, 2008

Related U.S. Application Data

(60) Provisional application No. 61/043,896, filed on Apr. 10, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................. 463/29; 463/20; 463/30; 463/31

(58) Field of Classification Search .................... 463/20, 463/29, 30, 31

See application file for complete search history.

(56) References Cited

U.S. PATENT DOCUMENTS

| | | | | |
|---|---|---|---|---|
| 6,071,190 | A | 6/2000 | Weis et al. | |
| 6,863,608 | B1 | 3/2005 | Lemay et al. | |
| 7,112,138 | B2 | 9/2006 | Hedrick et al. | |
| 2002/0068627 | A1 | 6/2002 | Muir | |
| 2003/0078103 | A1 | 4/2003 | Lemay et al. | |
| 2006/0121981 | A1 | 6/2006 | Pfennighausen et al. | |
| 2006/0217199 | A1 * | 9/2006 | Adcox et al. | 463/40 |

* cited by examiner

*Primary Examiner* — Jarrett Stark

(74) *Attorney, Agent, or Firm* — Knobbe, Martens, Olson & Bear, LLP

(57) ABSTRACT

A compositing apparatus is provided that has, in certain implementations, electronic circuitry for combining visual content for an electronic game of chance. The compositing apparatus may receive wagering display information from a wagering engine that controls wagering aspects of the game and entertainment display information from an entertainment engine that controls non-wagering aspects of the game. The compositing apparatus may combine the wagering and entertainment display information for presentation to a player on a display. In certain implementations, the compositing apparatus also enables the wagering engine to control the output of display information on the display.

28 Claims, 12 Drawing Sheets

COMPOSITING DEVICE FOR COMBINING VISUAL CONTENT

RELATED APPLICATION

This application claims the benefit of priority under 35 U.S.C. §119(e) of U.S. Provisional Patent Application No. 61/043,896, filed on Apr. 10, 2008, and entitled “Gaming system with Dynamic Entertainment Generation,” the disclosure of which is hereby incorporated by reference in its entirety.

BACKGROUND

Gaming devices that provide games of chance tend to be highly regulated and secure to achieve compliance with laws in the jurisdictions where they are operated. When software-based gaming devices are used, the gaming software is generally validated by an in-depth review so as to obtain approval from a regulatory body. This in-depth review often includes both laboratory evaluation and field validation. In-depth review and validation can be a costly and lengthy process and may require specialized and expensive consultants. The cost and time of the validation and review process can expand exponentially as the number of lines of software code increases.

The regulations imposed by the authorities in the various jurisdictions limit the flexibility of gaming machines. Regulating authorities view gaming machines as a source of potential fraud either by players or operators, and consequently impose strict controls on their design and operation.

SUMMARY OF CERTAIN EMBODIMENTS

In certain embodiments, a compositing apparatus is provided that has electronic circuitry for combining visual content for an electronic game of chance. The compositing apparatus may receive wagering display information from a wagering engine that controls wagering aspects of the game and entertainment display information from an entertainment engine that controls non-wagering aspects of the game. The compositing apparatus may combine the wagering and entertainment display information for presentation to a player on a display. In certain implementations, the compositing apparatus also enables the wagering engine to control the output of display information on the display.

Additionally, in various embodiments a system for providing content for an electronic game of chance includes an entertainment engine that can provide an electronic game of chance for use by a player and a wagering engine that can control at least wagering aspects of the game of chance. The entertainment engine may be subject to less regulation than the wagering engine. The wagering engine can process a wagering event and broadcast a message to the entertainment engine regarding the wagering event, without seeking a response from the entertainment engine. The wagering engine can also output information related to the wagering event for presentation to the player, independent of whether the wagering engine receives a completion message from the entertainment engine that indicates that the entertainment engine has provided entertainment content.

For purposes of summarizing the disclosure, certain aspects, advantages and novel features of certain inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION

Players are demanding more immersive entertainment experiences. Driven by their experience with online multi-player environments, some players find current gaming device offerings dated and restrictive. As a result, current gaming devices may fail to fully engage and entertain players. However, the complexity of software that might potentially be used to create immersive entertainment experiences can be too costly to validate for regulatory approval. Without the use of more complex software, gaming operators may find it difficult to respond to market demands, demographic trends, and the like.

This disclosure describes systems and methods for separating the highly regulated wagering environment of a game from the entertainment experience of a game. In certain embodiments, the wagering environment is governed by a wagering engine, which may include separate software and/or hardware components from an entertainment engine that controls an entertainment presentation. A compositing device may facilitate this separation by combining visual content information from the wagering and entertainment engines to provide combined wagering and entertainment visual content to a player. Because the wagering engine is separate from (or loosely coupled to) the entertainment engine, in certain embodiments the entertainment engine may be developed without regulatory testing and approval. As a result, in various embodiments, the entertainment experience may be enhanced by a variety of visual (and/or audio) methods.

Figure 1:
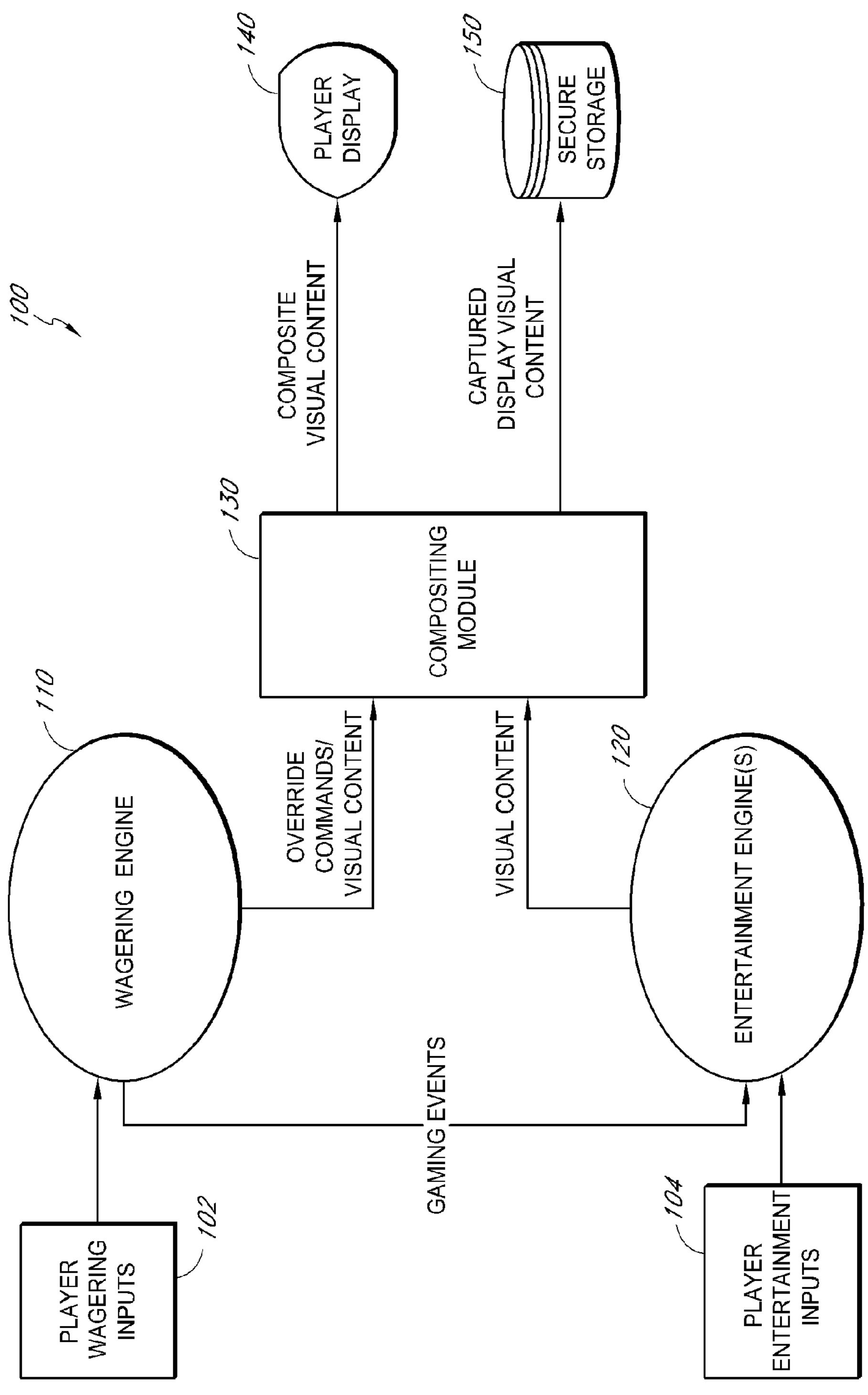
FIG. 1 is a block diagram illustrating an embodiment of a gaming system having a separate wagering engine and entertainment engine.

Referring to the drawings in general, and initially to FIG. 1, an embodiment of a gaming system 100 is shown. The gaming system 100 may include hardware and/or software components for providing a gaming experience to a player. For example, the gaming system 100 may include hardware and software components housed within a single gaming machine, such as a video slot or poker machine or the like. Advantageously, the gaming system 100 in certain embodiments separates regulated wagering functions from non-regulated (or less-regulated) entertainment functions.

More particularly, the gaming system 100 includes a wagering engine 110 and one or more entertainment engines 120. The wagering engine 110 includes hardware and/or software for accepting player wagering inputs 102, such as bets or the like. In one embodiment, the wagering engine 110 includes one or more processors, memory, and associated software modules for performing wagering functions on the one or more processors. The wagering engine 110 may be secure in certain embodiments. As used herein, the term "secure," in addition to having its ordinary meaning, may refer to having a degree of protection against intrusion, such as tampering, hacking, and the like. For instance, the wagering engine 110 may be secured by using various security measures such as encryption, user authentication mechanisms, validation of Read-Only-Memory (ROM) devices containing program code, security tape for tamper detection (e.g., on an enclosure surrounding the wagering engine 110), physical locking mechanisms (e.g., on the enclosure), combinations of the same, and the like.

The entertainment engine 120 includes hardware and/or software for accepting optional player entertainment inputs 104, such as inputs that affect video, graphics, and/or audio output. For instance, the entertainment engine 120 may receive inputs 104 that manipulate graphical display elements, such as virtual playing cards or the like. In one embodiment, the entertainment engine 120 includes one or more processors, memory, and associated software modules for performing entertainment functions on the one or more processors. Multiple entertainment engines 120 may be provided in some embodiments, for example, to separately provide graphics, video, audio, and the like.

Advantageously, in certain embodiments, the wagering engine 110 is separated from and/or loosely coupled to the entertainment engine 120. This separation/loose coupling may be provided by using separate processors for the wagering and entertainment engines 110, 120. The two engines 110, 120 may also have separate memory, disk storage, and other hardware devices. As a result of the separation of the engines 110, 120, in certain embodiments the wagering engine 110 advantageously performs most, all, or substantially all regulated gaming functions. Thus, the wagering engine 110 may be subject to regulatory-related validation and testing.

In contrast, the entertainment engine 120 may perform fewer or no regulated gaming functions, allowing the entertainment engine 120 to be exempt from regulatory validation and testing, or to have reduced validation and testing requirements. Thus, designers of the entertainment engine 120 can be free to generate more complex and/or entertaining hardware and/or software than is presently found in currently-available regulated gaming devices. For instance, in one example the entertainment engine 120 can implement a gaming experience that is similar to platform-system gaming, such as may be found on the Xbox®, Playstation®, Nintendo®, or other similar systems. Additionally, separation of the engines 110, 120 can protect the wagering engine 110 from being compromised in the event that the entertainment engine 120 is compromised.

The separation of the two engines 110, 120 described above is merely illustrative. Other forms of separation may be used to keep the regulated gaming aspects in the wagering engine 110 based on what may be allowed by current or future gaming regulations. For instance, the engines 110, 120 may run on different cores of the same processor while using separate memory devices, or the engines 110, 120 may run on separate processors but use the same memory device. In still other embodiments, the two engines 110, 120 may run on the same processor (or core) and use the same memory device. The same memory device might be used if, for example, some form of software protection prevents the entertainment engine 120 from accessing memory used by the wagering engine 110.

The wagering engine 110 may perform wagering-related events and send messages to the entertainment engine 120 regarding the events. In response, the entertainment engine 120 can perform certain entertainment functions, such as presenting graphical entertainment to the player. As an example, the wagering engine 110 might receive a bet input 102 from a player. The wagering engine 110 can use a random number generator and one or more paytables to calculate whether the player wins or loses, the payout amount, and so forth.

The wagering engine 110 may then provide a message or messages to the entertainment engine 120 stating that the player won (or lost) and optionally by how much, among other details. In response, the entertainment engine 120 can provide entertainment content corresponding to the win or loss. Once the entertainment engine 120 has completed providing content, the entertainment engine 120 may notify the wagering engine 110 that it has finished. In response, the wagering engine 110 can continue operating. However, the wagering engine 110 may also continue to operate without receiving a completion message from the entertainment engine 120 (see FIGS. 2 and 4).

Both the wagering and entertainment engines 110, 120 can provide visual content to a player display 140 through a compositing module 130. The compositing module 130 can include hardware and/or software for combining visual content such as video, graphics, images, and the like from the two engines 110, 120. For instance, the compositing module 130 can include hardware and/or software multiplexors, multipliers, mixers, and/or the like for combining visual content. The compositing module 130 may combine the visual content by mixing, masking, compositing, or otherwise combining pixels, regions of pixels, and the like. In some embodiments, the compositing module 130 may also combine audio content from the two engines 110, 120.

Examples of visual content that might be provided by the wagering engine 110 include graphics and/or video content related to game rules, betting sequences, game results, and credits updates. Examples of visual content that might be provided by the entertainment engine 120 include graphics and/or video related to non-wagering entertainment, such as graphical playing cards, slot machine elements, action sequences, platform gaming graphics, and the like. The compositing module 130 might, for instance, combine an image of "You win!" from the wagering engine 110 with a display of a playing card hand from the entertainment engine 120.

Advantageously, the compositing module 130, in certain embodiments, facilitates the separation of the wagering and entertainment engines 110, 120. By combining content from each engine 110, 120, the compositing module 130 allows the content to be generated separately by each engine 110, 120. In various implementations, the wagering engine 110 has the ability to control the compositing module 130 such that the wagering engine's 110 visual content take precedence over any other visual content offered by the entertainment engine 120.

The wagering engine 110 can also send commands to the compositing module 130 to capture displayed visual content, such as images and video, and to store this visual content in a storage device 150. The displayed visual content can include visual content that was provided to the player display 140. The compositing module 130 may also automatically capture the displayed visual content. The storage device 150 may include physical storage and may include security measures in certain embodiments.

In certain embodiments, storing displayed visual content enables the creation of a verifiable audit trail that may allow regulators to reconstruct gaming events. The stored displayed visual content may also be used to resolve disputes between players and gaming operators. Advantageously, in certain embodiments, by storing content that was actually displayed on the player display 140, the compositing module 130 may further enable the entertainment engine 120 to include unregulated features separate from the wagering engine 110.

Figure 2:
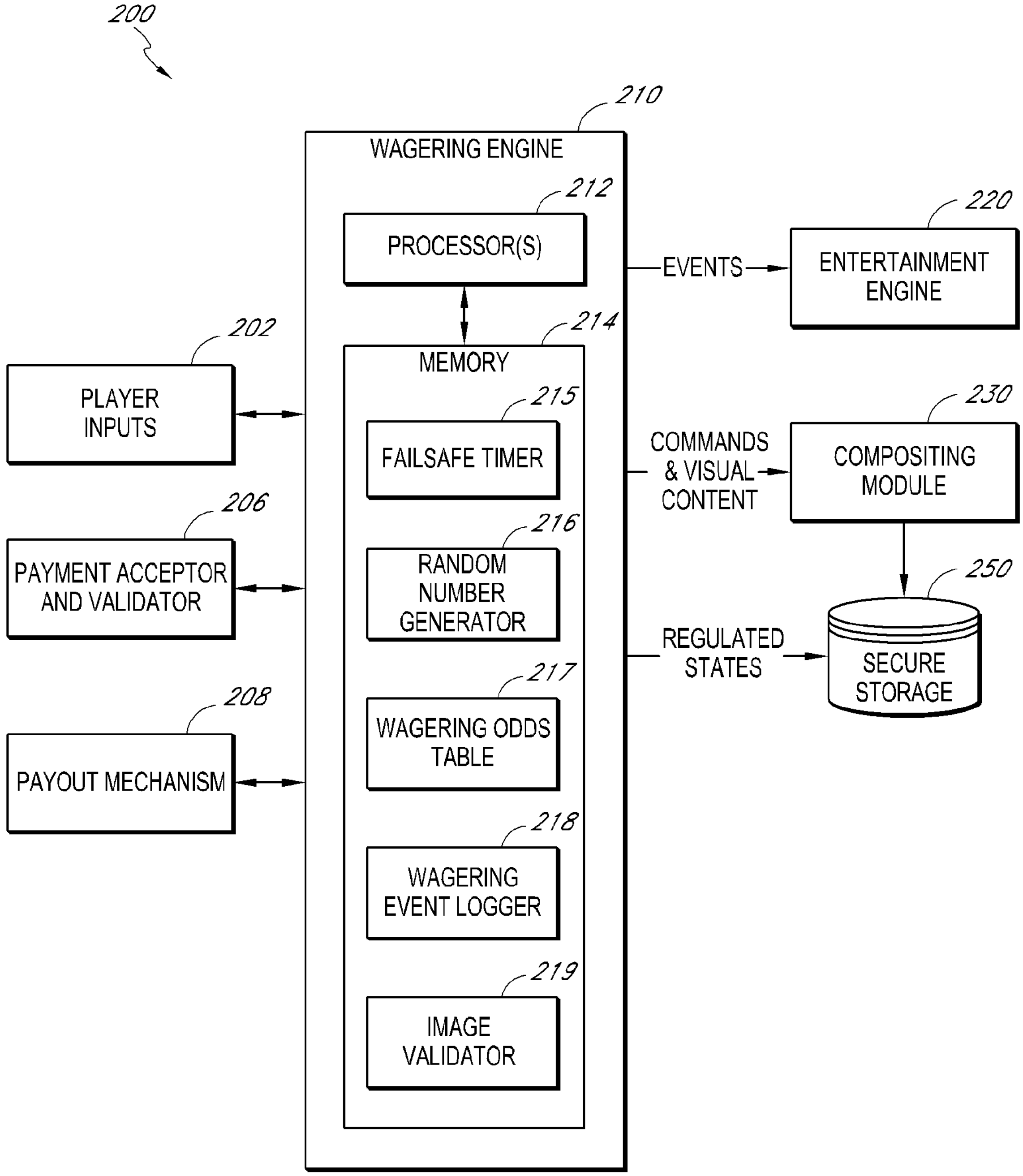
FIG. 2 is a block diagram illustrating an embodiment of the wagering engine.

Referring to FIG. 2, a more detailed embodiment of a wagering engine 210 is shown. The wagering engine 210 may have all the functionality of the wagering engine 110 described above. In the depicted embodiment, the wagering engine 210 includes one or more processors 212 and memory 214. The wagering engine 210 is also shown as being separate and/or loosely coupled to an entertainment engine 220, which may have all of the functionality of the entertainment engine 110 described above.

In certain embodiments, the memory 214 of the wagering engine 210 includes static or non-volatile random access memory (RAM) and/or electronically programmable read only memory (EPROM) or the like. The memory 214 can be made secure or substantially secure, protected from writing, combinations of the same, and the like. In certain embodiments, the memory 214 stores wagering applications and/or wagering data. These wagering applications and/or data may be accessed directly from the memory 214 by the processor 212. In an embodiment, these applications and/or data are not alterable by the processor 212 so as to increase security and/or to comply with regulations.

Several example wagering applications and data are shown stored in the memory 214 in the depicted embodiment. The applications include a failsafe timer 215, a random number generator 216, a wagering events logger 218, and an image validator 219. A wagering odds table 217 is also included as an example of wagering data. The failsafe timer 215 may include one or more software or firmware components for controlling the time that the entertainment engine 220 provides entertainment content (see FIG. 4). The random number generator 216 may include software and/or firmware for randomly or pseudo-randomly generating numbers that may be used to determine whether a player has won or lost a particular game of chance.

The wagering event logger 218 may include software and/or firmware components that log information about wagering events in a storage repository 250. For instance, the wagering event logger 218 may log wagering states, such as an accepting of payment, placement of a wager, a wager result, and wager payout. In addition, the wagering event logger 218 may log wagers, generated random numbers, odds, player inputs, and other events data associated with a player's wagering events. The wagering event logger 218 may also instruct a compositing module 230 to record visual content displayed to a player into the storage repository 250.

The wagering odds table 217 may include data on odds used for one or more games of chance. In one embodiment, the wagering odds table 217 may be updated to change the odds from time to time. Alternatively, the wagering odds table 217 may be protected from editing. The image validator 219 may compare images generated by the wagering engine 210 with images displayed to a player to determine that the correct images have been displayed. The image validator 219 is described in greater detail below.

The wagering engine 210 receives player inputs 202 from players. Player inputs 202 may include any combination of switches, joysticks, touch screens, image capture devices, audio input devices and associated equipment that can be used to capture player actions. Payment acceptor and validator devices 206 may also communicate with the wagering engine 210. These devices 206 may include any combination of coin acceptors, bill validators, interfaces to credit or debit cards, interfaces to cashless systems such as Paypal®, and the like. Additionally, the wagering engine 210 may communicate with a payout mechanism 208, which may include any combination of coin hoppers, bill dispensers, token dispensers, debit card interfaces, credit card interfaces, interfaces to cashless systems such as Paypal®, and the like.

The wagering engine 210 is loosely coupled to the entertainment engine 220 in certain embodiments by event messages. For instance, when the wagering engine 210 changes wagering states, e.g., by accepting payment, placing a wager, determining a wager result, and/or by providing a wager payout, the wagering engine 210 may broadcast or otherwise communicate these states to the entertainment engine 230 by event messages. In certain embodiments, the wagering engine 210 broadcasts the states without looking for a response from the entertainment engine 220. By broadcasting events or states, in certain embodiments, the wagering engine 210 acts independent of any actions of the entertainment engine 220.

In response to receiving the event messages, the entertainment engine 230 may perform certain entertainment functions, as will be described in greater detail below with respect to FIG. 5. Once the entertainment engine 220 has completed an entertainment sequence, the entertainment engine 220 can broadcast a completion message to the wagering engine 210. The wagering engine 210 may then perform other wagering functions. In certain embodiments, if the entertainment engine 220 does not broadcast a completion message to the wagering engine 210, the wagering engine 210 still performs other wagering functions.

In operation, the wagering engine 210 may be actuated by a player payment. Wagering activity can then be initiated by the player through a player input 202 such as pressing a button to close a switch, touching a selected area on a touch screen, manipulating a joystick, speaking a voice command or making a recognizable gesture that can be interpreted by an image capture device. Upon receiving the player input 202, the wagering engine 210 can calculate a wagering outcome (e.g., win or loss) using the random number generator 216 and the wagering odds table 217. Once the win or loss is determined, the wagering event logger 218 can log or store the wagering outcome in the secure storage 250. In an embodiment, the wagering engine 210 performs this logging before sending display information to the compositing module 230 and/or before sending event information to the entertainment engine 220. Thus, in the event of a loss of power or other equipment failure, the player's wagering outcome is preserved and may be later retrieved.

The wagering engine 210 may provide the wagering outcome and other states or events to the entertainment engine 220. The entertainment engine 220 performs an entertainment sequence and notifies the wagering engine 210 that it has completed the entertainment sequence. In response to this notification, or upon triggering by the failsafe timer 215 (see FIG. 4), the wagering engine 210 transmits the wagering outcome through the compositing module 230 to the player display (see FIG. 1). The wagering outcome may be signaled to the player by a variety of visual and/or audio components.

If the wagering outcome is a winning one for the player, the wagering engine 210 can cause the payout mechanism 208 to dispense winnings to the player. These winnings may be dispensed in the form of coins, tokens, paper currency, electronic transfers of money or credits, combinations of the same, or the like. The wagering engine 210 can output for display the amount of the winnings through the compositing module 230. The wagering event logger 218 can command the compositing module 230 to capture the visual content displayed to the player on the player display, and to store those captured visual content in the storage device 250.

As described above, the image validator 219 may compare images generated by the wagering engine 210 with images displayed to a player to determine that the correct images have been displayed. The image validator 219 may include hardware and/or software that can communicate with the storage device 250 to validate the display of wagering results upon the player display. For example, the image validator 219 can be used to determine whether the images displayed to the player (as stored in the storage device 250) correctly correspond to the images that should have been displayed. The image validator 219 may make this determination by comparing some or all of an image provided by the wagering engine 210 to the compositing module 230 with an actual image stored in the storage device 250. Thus, the image validator may compare the wagering visual output of the wagering engine 210 to what was actually displayed to the player, to determine whether the correct wagering visual output was shown to the player.

If the images do not match, the wagering engine 210 or compositing module 230 may be corrupted or otherwise tampered with. Thus, the wagering engine 210 may generate an error or exception and shut down the gaming system. This error may be logged in memory and/or may be provided to an operator of the gaming system, such as a casino operator. The operator may then have the opportunity to investigate the cause of the error and take corrective action.

The image validator 219 further facilitates, in certain embodiments, the separation of the wagering engine 210 and the entertainment engine 220. Because the actual output to the player can be validated by the image validator 219, the output provided by the entertainment engine 220 may not need to undergo regulatory validation and testing. Advantageously, in certain embodiments, the image validator 219 can validate images without stopping the electronic game of chance. Thus, images may be validated during game play. In addition, in some embodiments, the image validator 219 may also validate images post-game, such as during an audit process. Additional details regarding the image validator 219 are described in further detail with respect to FIG. 12 below.

Although not shown, in certain embodiments an external auditing device interface may also be provided to the secure storage repository 250. Through this interface, an auditor or regulator may use an external auditing device, such as a computer, to access images stored in the secure storage 250. The auditor or regulator may therefore determine whether the output from the wagering engine 210 has been correctly displayed on a player display. Image components created by the entertainment engine 220 may also be examined for regulatory compliance such as image content of a misleading or unapproved nature.

Figure 3:
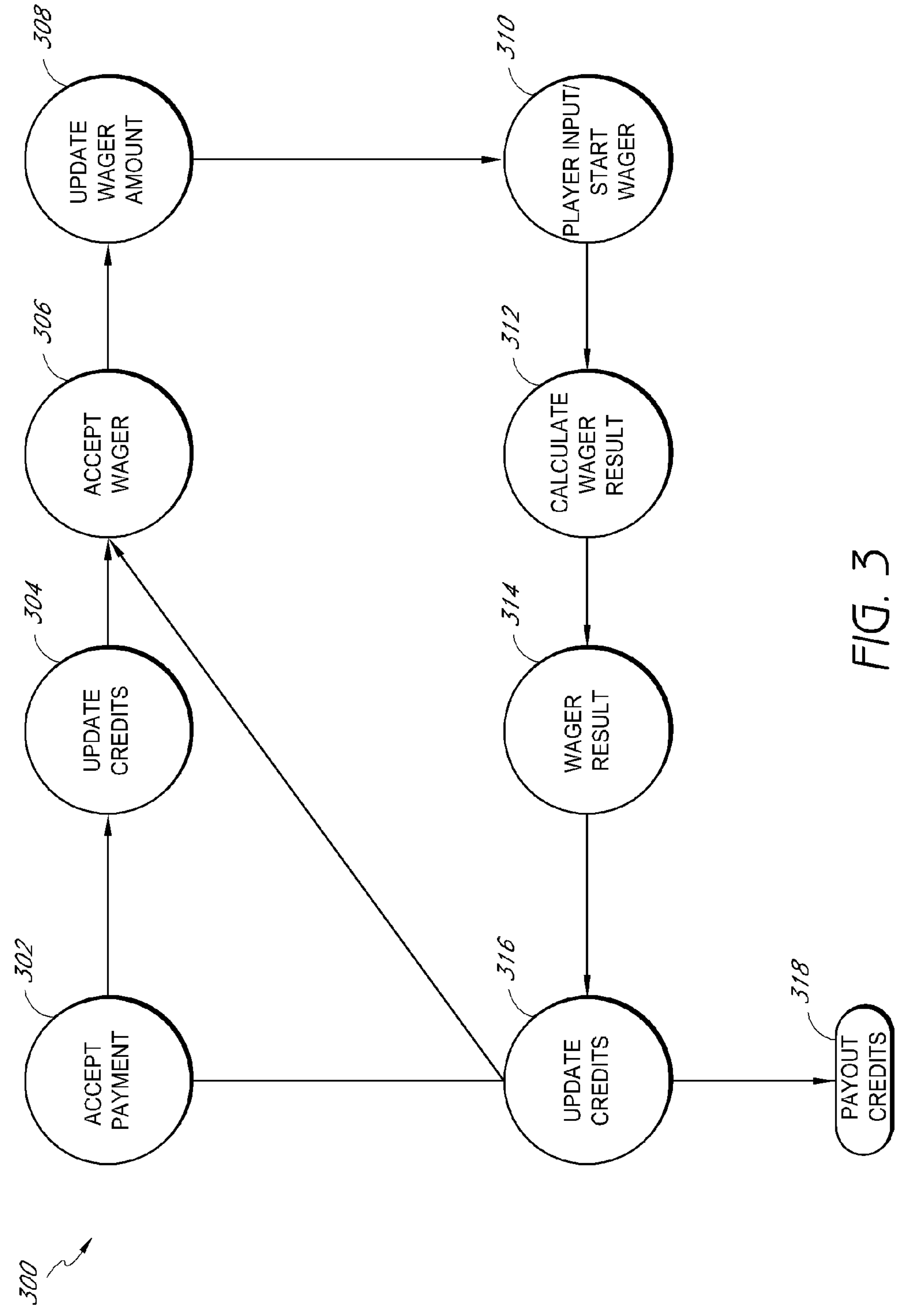
FIG. 3 is a state-flow diagram illustrating an embodiment of wagering event states broadcasted by the wagering engine to the entertainment engine.

FIG. 3 illustrates an embodiment of a state flow 300 that illustrates example wagering states that the wagering engine 110 or 210 may transition through. As described above, the wagering engine may broadcast or otherwise communicate one or more of these states to the entertainment engine 120 or 220 during the course of a game.

An initial state 302 may occur in one embodiment when the wagering engine accepts payment from a player. The wagering engine may then update the player's credits at state 304. In the next state 306, the wagering engine can accept a wager from the player. The wagering engine then updates the wager amount at state 308. At state 310, the wagering engine accepts player input and starts the wager. Wager results are calculated at state 312 by the wagering engine using, for example, the random number generator 216 and the wagering odds table 217. The wager results are then presented to the player at state 314. After the wager results have been presented, the amount of available player credits may be updated at state 316. At this time, the player can either payout some or all credits at state 318, enter a payment at state 302, or place another wager at state 306.

During the update of the credits at state 316, the wagering engine can cause the compositing module to capture a composite view of the player display and store this composite view in a storage device. This composite view may include an image of the screen presented to the player at a point in time when the game result was presented to the player. In one embodiment, the wagering engine causes the display to "freeze" for a period of time, such as from one to five seconds. This freeze period can prevent the entertainment engine from potentially confusing the player as to the game result and can provide a quiet period where the game result is shown to the player in a convincing way. During this freeze period, the compositing module can capture the view seen by the player and store the image in secure storage.

In other embodiments, the wagering engine may cause the compositing module to capture images during one or more additional states of the state flow 300. In addition, the images may be captured more or less frequently, such as once per second, every frame, every other frame, and so forth.

As described above, the states in the state flow 300 may be broadcast or otherwise communicated from the wagering engine to the entertainment engine. However, in some embodiments, not all of the states of the wagering engine are broadcast or otherwise communicated to the entertainment engine. To facilitate the security of the regulated experience, for example, the accepting and/or validation of payment at state 302 and the actual payout at state 318 are not communicated to the entertainment engine.

Figure 4:
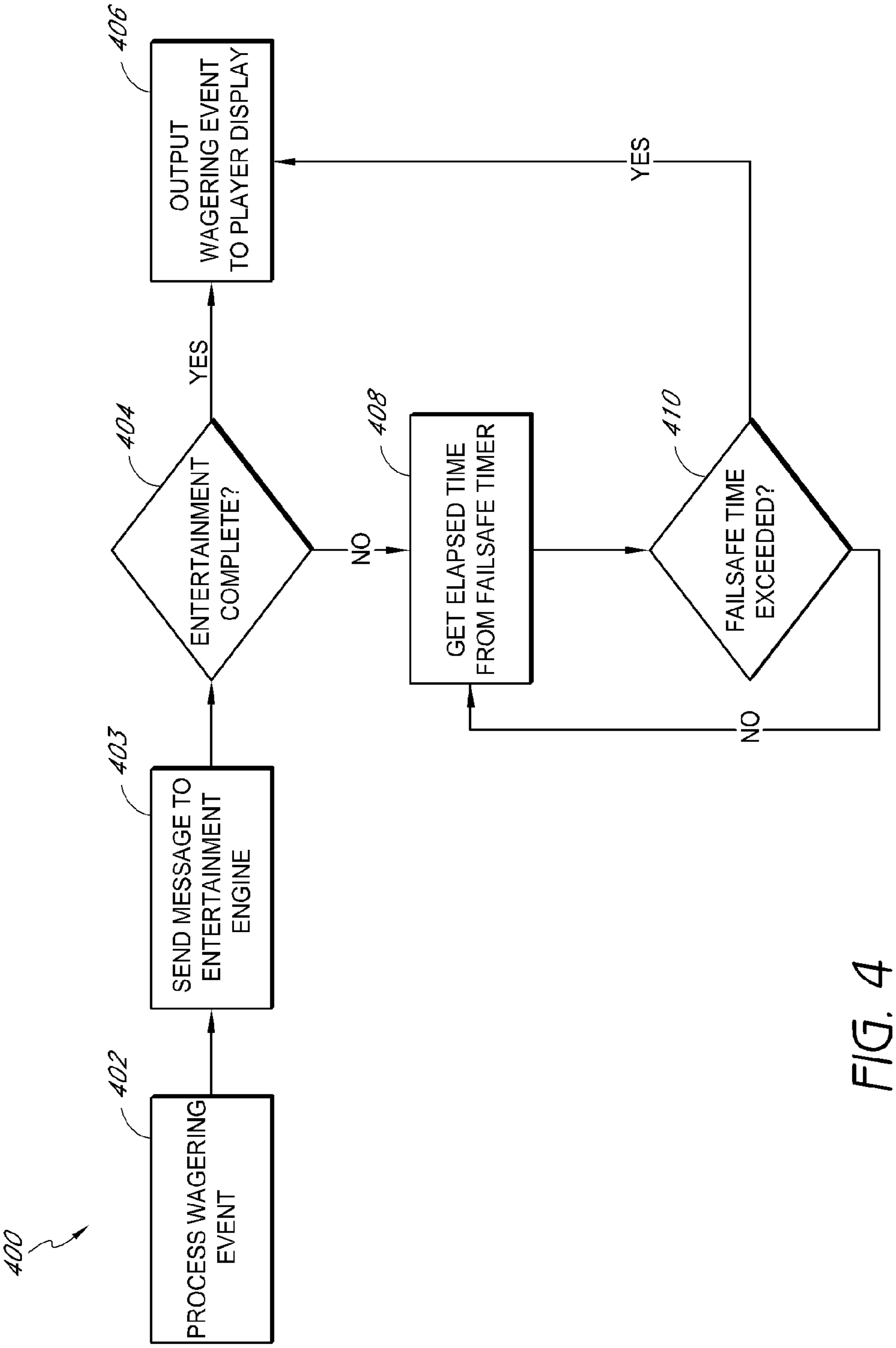
FIG. 4 is flow diagram illustrating an embodiment of a wagering engine failsafe process.

FIG. 4 illustrates an example process 400 for controlling time that the entertainment engine provides entertainment content. The process 400 may be implemented by the wagering engine 110 or 210. The process 400 advantageously allows the wagering engine, in certain embodiments, to provide wagering display information to a player regardless of whether the entertainment engine fails, stalls, or is corrupted. For example, the process 400 may allow the wagering engine to overwrite the entertainment engine's presentation of content if the entertainment engine fails, stalls, or is corrupted. Thus, in certain embodiments, the entertainment engine is unable to influence wagering events or prevent wagering events from being communicated to a player.

At block 402, the wagering engine processes a wagering event or state, such as an accepting of payment, placement of a wager, a wager result, or a wager payout. When the wagering engine processes a wagering state, the wagering engine can send a wagering event message containing the wagering state to the entertainment engine at block 403. The wagering engine may then enter a loop state at block 404 where it checks if the entertainment engine has completed presenting an entertainment experience that corresponds to the wagering state.

If the entertainment engine has completed presenting the entertainment experience corresponding to the wagering state, at block 406 the wagering engine exits the loop state and presents the wagering state to the player. The entertainment engine may inform the wagering engine of its completion of presenting the entertainment experience. If the entertainment engine has not completed presenting the entertainment experience corresponding to the wagering state, at block 408 the wagering engine checks a failsafe timer to determine whether the failsafe time has been exceeded.

If the wagering engine determines at block 410 that the failsafe time has not been exceeded, the wagering engine remains in the loop state and checks the elapsed time again at block 408. Otherwise, the wagering engine presents the wagering event to the player and exits the loop state at block 406. The wagering engine may present the wagering event to the player by instructing the compositing module to overwrite, freeze, or blank entertainment content, or otherwise cause the wagering event to be displayed in place of some or all entertainment content. In addition, the wagering engine may cause the compositing module to ignore additional display output from the entertainment engine. In certain embodiments, the process 400 therefore allows regulated wagering results to be presented to the player even if the entertainment engine fails or is corrupted.

One advantage provided in certain embodiments by separating the entertainment and wagering engines is that the entertainment engine may provide variable-length entertainment sequences. This is shown implicitly in FIG. 4 at block 404, where the wagering engine waits for the entertainment engine to finish providing content. The timing of the entertainment engine may be adjusted, among other reasons, to speed up or slow down the game at different times of the day (such as speeding up during busy times), to provide instant win/lose functionality (e.g., for those of Asian cultures who prefer instant notification), and the like. This adjustment may be made automatically (e.g., based on time of day) or under control of an operator of the gaming system.

Figure 5:
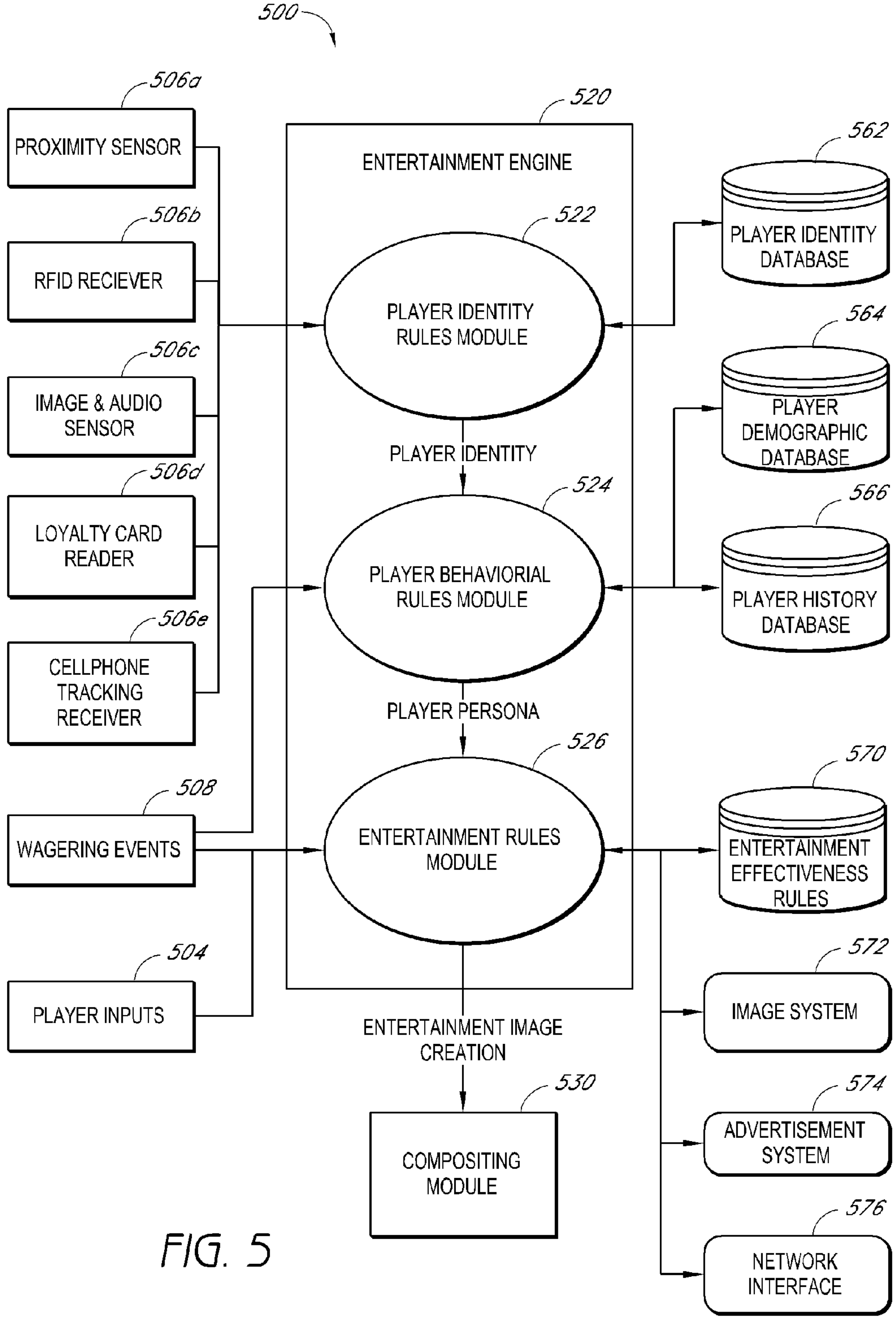
FIG. 5 is a block diagram illustrating an embodiment of the entertainment engine.

FIG. 5 illustrates a more detailed embodiment of an example entertainment engine 520. The implementation of the entertainment engine 520 may vary widely depending on a designer's goals for a game and functionality. Advantageously, this variety is facilitated in certain embodiments by the separation of the wagering and entertainment engines. Because of the inherent variety in potential entertainment engine implementations, the embodiment shown is merely illustrative.

The depicted embodiment of the entertainment engine 520 includes a player identity rules module 522, a player behavioral rules module 524, and an entertainment rules module 526. Each of these modules may include one or more hardware and/or software components.

The player identity rules module 522 can obtain information about a player's identity from one or more identification devices 506. The identification devices 506 may include, but are not limited to, proximity sensors 506*a*, RFID receivers 506*b*, image and audio sensors 506*c*, a loyalty card reader 506*d*, a cellphone tracking receiver 506*e*, combinations of the same, and the like. When a first wagering event message 508 for a particular player is received by the entertainment engine 530 from the wagering engine, the player identity rules module 522 may access the identification devices 506 to obtain the player's identity. Alternatively, the player identity rules module 522 may access a player identity database 562 to find the player's identity. The player identity database may then return the player's identity (if one exists) to the player identity rules module 522, which can in turn send the player's identity to the player behavioral rules module 524.

The player behavioral rules module 524 in certain implementations uses the player's identity to query a player demographic database 564 and a player history database 566. The player demographic database 564 can return some or all known demographic and/or psychographic data about this particular player to the player behavioral rules module 524. The player history database 566 can return some or all known player history for this particular player to the player behavioral rules module. Advantageously, in some embodiments, the player behavior rules engine 524 integrates certain demographic, psychographic, and/or behavioral information for the player and creates a player persona. The player persona may include information on interests of the player that are inferred by the player behavioral rules module 524 from the demographic, psychographic, and/or behavioral information.

The entertainment rules module 526 may use the player persona to create and/or select an entertainment experience, such as a particular game, for the player that may be targeted toward the player's interests. For instance, the entertainment rules module 526 may use the player persona to query the entertainment effectiveness rules database 570. The entertainment effectiveness rules database 570 can return a set of parameters that guides the entertainment rules module 526 in selecting an entertainment experience from an image system 572 and an optional corresponding advertising experience from an advertisement system 574. The entertainment experience and advertising experience may include a variety of visual and/or audio content. This content can be sent by the entertainment rules module 526 to the compositing module 530, which can combine the visual and/or audio content with wagering content to create composite images and/or audio for presentation to the player.

In another embodiment, the entertainment rules module 526 may also select visual and/or audio content from one or more servers, e.g., over the Internet or other network, via a network interface 576. This content may include, for example, streaming media, online videos, advertisements served by third parties, and the like.

The entertainment content created by the entertainment engine 530 is non-specific, and can be dynamically adjusted to suit the desires of the player and the casino operator. For illustrative purposes, example entertainment content might include:

Graphical game sequences: The entertainment engine 530 may select attractive, instructional, or explanatory entertainment content while the wagering engine is in an idle or waiting state. As money is deposited and wagers are placed, the wagering event messages 508 sent to the entertainment engine 530 cause it to generate image streams that present game play for the game selected. The wagering results events messages 508 cause the entertainment engine 530 to create a different image sequence, depending upon the specific wagering result.

Player-controlled display: For some types of games, inputs from the player can vary the video display sequence in response to the player input 504. These variations may have no effect on the game outcome, which in certain embodiments is governed by the wagering engine, but can enrich the gaming experience for the player. The player inputs 504 can be sent to the entertainment engine 503, which can dynamically select or create the optimum entertainment experience for the player. This capability can also enable the player to select different types of games for play.

Multiplayer sequences: By monitoring real-time (or near-real time) messages from the network interface 576, the entertainment engine 530 can broadcast game sequences to other similar gaming systems over a network (e.g., LAN, WAN, the Internet, or the like), or accept image streams from other gaming systems on the network. This network cooperation between gaming systems may enable the creation of video streams by the entertainment engine 530 that contain sequences constructed by multiple different players on multiple different gaming systems simultaneously. For example, playing card hands from multiple players in a poker game could be presented by the entertainment engine 530 to the player. As the entertainment engine 530 can dynamically create entertainment experiences, this shared data can enable the display of multiplayer gaming experiences on the gaming system display using various techniques for network based gaming.

Downloaded video streams: A networked image server can deliver video messages for inclusion into the display stream produced by the entertainment engine 530. This capability can enable the entertainment engine 530 to deliver alerts, player welcome, or other types of messages to the gaming system display screen.

Advertising video streams: A networked ad server can deliver targeted advertising messages for inclusion into the display stream produced by the entertainment engine 530. This capability can enable the entertainment engine 530 to deliver targeted, personalized advertising experiences to the gaming system display screen.

Figure 6:
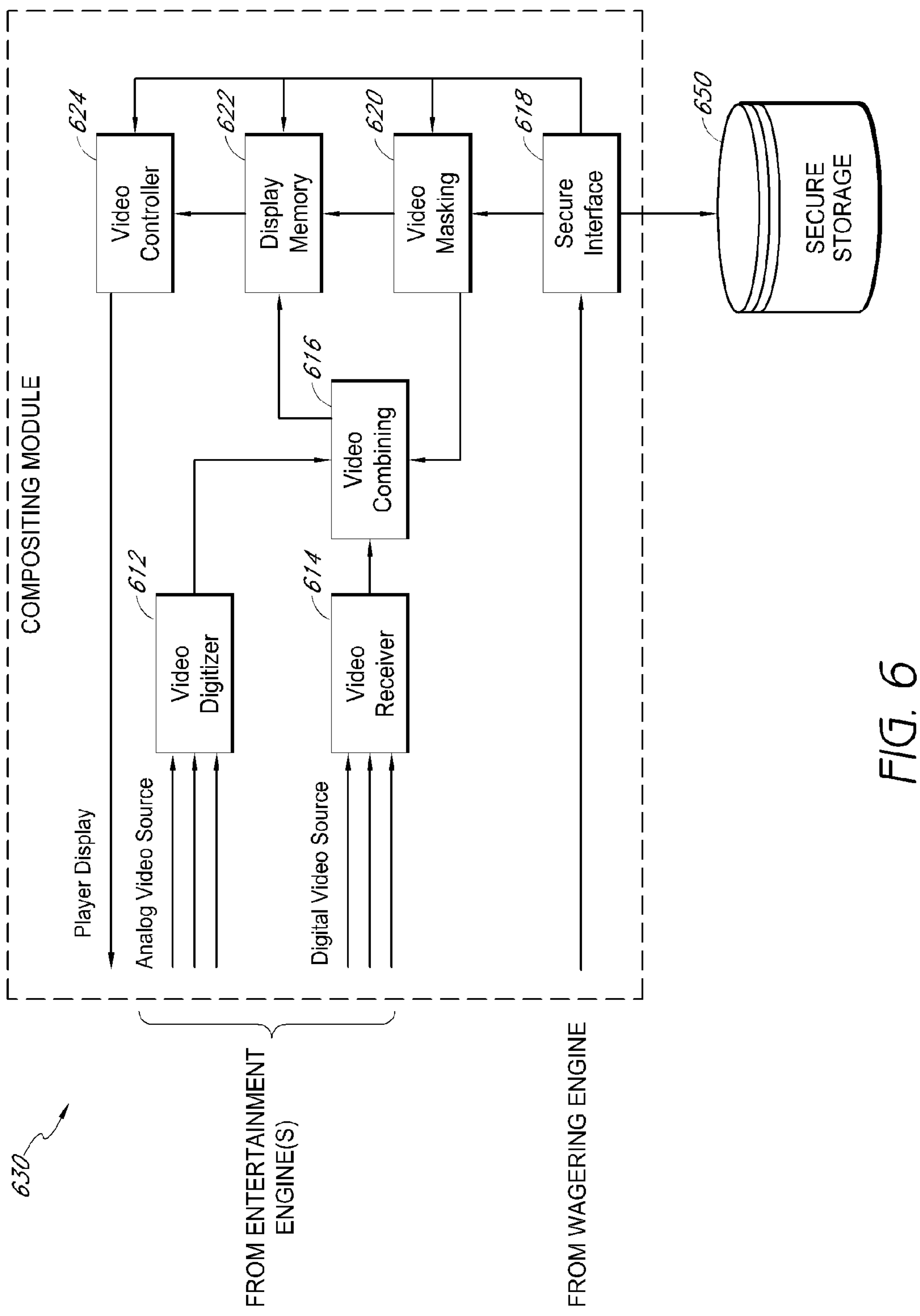
FIG. 6 is a block diagram illustrating an embodiment of the compositing module.

FIG. 6 illustrates a more detailed embodiment of a compositing module 630. The compositing module 630 may include all of the features of the compositing modules 130, 230, and 530 described above. In one embodiment, the compositing module 630 is a hardware device including electronic circuitry that can interface with the wagering and entertainment engines via buses or other hardware connections (not shown). Various components of the compositing module 630 may also include software and/or firmware for performing compositing functions. Although not shown, the compositing module may also composite audio. In addition, although described primarily in the context of electronic circuitry, at least some of the features of the compositing module 630 may be implemented in software and/or firmware.

The compositing module 630 may be a video capture module with programmable and configurable image masking functions, which may be under the control of the wagering engine. The compositing module 630 can allow the wagering engine to have complete or substantially complete control over the display shown to the player, as well as the ability to capture the displayed image for audit and verification purposes.

The compositing module 630 in the depicted embodiment can include various components which can enable the creation of composite images from various video and/or graphics sources. These components may also enable the wagering engine to control the final image displayed to the player, e.g., on a pixel-by-pixel basis. These components may include, but are not limited to, a video digitizer 612, video receiver 614, a video combining module 616, a video masking module 620, a display memory module 622, a video controller 624, and a secure interface 618 for the wagering engine.

In certain embodiments, the compositing module 630 can accept both analog and digital video in differing formats from differing sources simultaneously, such that many sources may be mixed on the screen at one time. In the case of analog video sources, the video may be digitized by use of an analog-to-digital converter within the video digitizer 612 (see FIG. 7). The video digitizer 612 may, for instance, convert analog video streams into an array of digital data frames which may be presented to the video combining module 616. Digital video sources can be received, decoded, and converted into digital frames by the video receiver 614. The video receiver 614 can present these digital frames to the video combining module 616. The digital frames may be represented as raster graphics or the like. Multiple video digitizers 612 and video receivers 614 may be provided in other embodiments.

The video digitizer 612 can include circuits such as analog-to-digital converters, timing generators, buffer logic, and the like that allow analog video inputs to be converted to digital format for manipulation. The video receiver 614 can include circuits such as a digital media receiver, decoder, timing and framing circuits, or the like that allow digital video media to be captured and stored in memory for display. The video combining module 616 can include components such as multiplexor circuits, multiplier circuits, mixer circuits, and/or the like capable of selecting one or more of the presented video streams for inclusion in the displayed video stream.

The secure interface 618 can include circuits for enabling the wagering engine access to some or all memory spaces, control register functions, and video output functions in the compositing module 630. The video masking module 620 may include circuits for providing functions that enable the wagering engine to select which image sources can have their video data displayed on the player display screen. In certain embodiments, the video masking module 620 allows the wagering engine to select, on a pixel-by-pixel basis, whether an input image can be displayed, masked, or combined with other sources for display.

The display memory module 622 can include circuits that contain the end result of the combined image. The display memory module 622 may include the result from the video combining module 616 and/or the video masking module 620, along with displayed graphics generated directly by the wagering engine into display memory. The video controller 624 can include circuits such as a video display controller, which may be under the direction of the wagering engine. The video controller 624 may, for example, allow the contents of the display memory module 622 to be shown on the player display in a format suitable for that display.

In example operation, the compositing module 630 may monitor a multitude of video sources that may be from different physical embodiments. In certain embodiments, an analog video source might be presented from the entertainment engine, which provides game graphics. A digital source might be provided from a background video element of the entertainment engine, and an alternate analog video source might be provided from the entertainment engine from a device such as a high-definition DVD player. Analog inputs can be capable of detecting incoming signals and determining the video format presented at the input, whether VGA style from a computer, Component or S-Video from a media player, or another common analog video format. Digital inputs can be capable of detecting the inbound digital video format from a range of Digital Video Interface (DVI) formats, including HDMI and LVDS formats.

The video combining module 616 can receive mask input from the video masking module 620. The mask input can be controlled by the wagering engine and may dictate which pixels may be displayed by the wagering engine and which may be displayed by the entertainment engine, or a combination of both. For example, the wagering engine may set attributes for the composite image on a pixel-by-pixel basis, such that at any point on the screen, the pixel presented may be provided by any of the active video sources for that pixel, may be a combination of two or more video sources, or may be blanked out such that no image is displayed. In certain embodiments, this blanking function can be used to reserve certain regions of the screen for the exclusive use of the wagering engine.

The video combining module 616 can form a composite image that represents the contribution of the image from some or all video sources, influenced by the mask input. The composite image may be provided by the video combining module 616 to the display memory module 622.

The display memory module 622 in various implementations contains the image to be shown to the player during the current video frame. The display memory module 622 may be updated by the video masking component, and optionally by the wagering engine at video frame intervals which are set by the video controller 624. In operation, the video controller 624 can present the contents of the display memory module 622 to the player display. Optionally, the wagering engine may read the contents of the display memory module 622 from time to time under program control. By directly reading the display memory module 622, in certain embodiments the wagering engine can capture a record of the precise image shown to the player for audit and play verification, dispute resolution, and for regulatory certification purposes.

In certain embodiments, the compositing module 630 may process one pixel at a time or multiple pixels at a time. For instance, the compositing module 630 may process four or more pixels at a time, a line of pixels at a time, or multiple regions or lines of pixels at a time. When multiple pixels are processed, the compositing module 630 may include multiple video digitizers 612, video receivers 614, video combiners 616, video masking modules 620, display memory modules 622, and the like.

Figure 7:
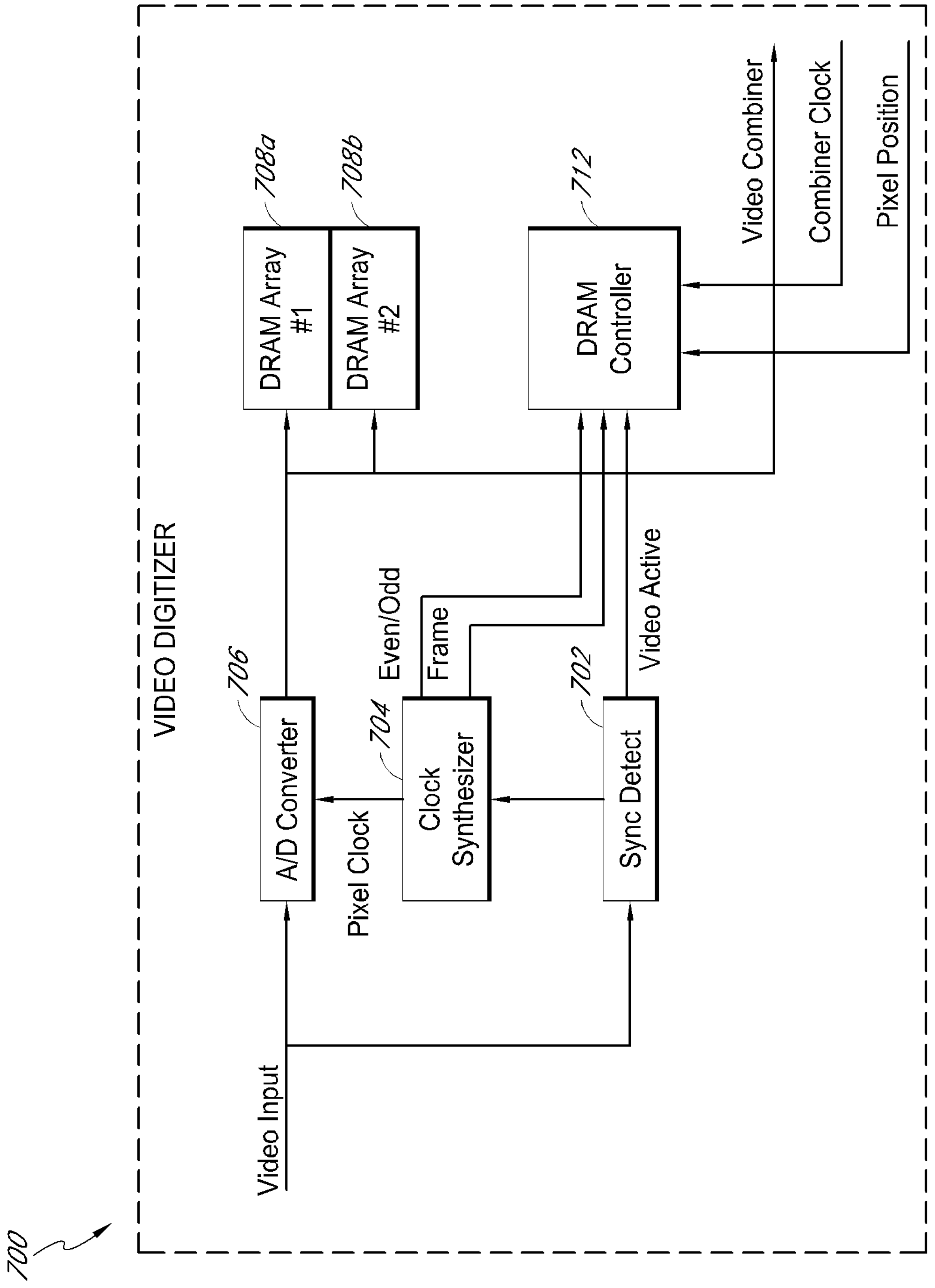
FIG. 7 is a block diagram illustrating an embodiment of a video digitizer of the compositing module.

FIG. 7 illustrates a more detailed embodiment of a video digitizer 700, which may have all of the functionality of the video digitizer 612 described above. As described above, the video digitizer 700 may be used to process analog video signals.

Analog video is received by a sync detect circuit 702 capable of detecting the presence of horizontal and vertical synchronization (HSYNC and VSYSNC) indications in an analog video stream. When an active video input signal is detected, in one embodiment the sync detect circuit 702 activates a DRAM controller 712 and provides the HSYNC and VSYNC signals to a clock synthesizer circuit 704.

The clock synthesizer circuit 704 may include a digital Phase Locked Loop (PLL) circuit that receives the HSYNC signal and creates a pixel clock signal. The pixel clock signal can estimate the position of each pixel in each horizontal line of the incoming video stream. The clock synthesizer 704 may also create an even/odd signal to indicate whether the active video line is in the even or odd field (e.g., for interlaced video formats). The clock synthesizer 704 may also create a frame signal to indicate to the DRAM controller 712 that a captured frame is complete in an active DRAM array 708.

The analog/digital (ND) converter 706 uses the synthesized pixel clock to sample the video stream, and convert the analog video level to a digital representation. Video may be coded by the ND converter 706 into several different formats. For example, the sampled pixel may represent 24-bits of information for each pixel, coded using an YCbCr Intensity/Luminance/Chrominance method. Other color coding formats are possible. The coded digital pixel information is presented to the DRAM array's 708 data bus.

The DRAM array 708 serves as storage for captured data and is organized into two banks 708*a*, 708*b*. At one time, one of the banks 708 is actively capturing incoming video from the ND converter 706. The DRAM bank 708 that is capturing data operates on the sample clock created by the clock synthesizer. Pixels are organized as sequential pixels forming a complete line. For non-interlaced inputs, the lines are captured sequentially. For interlaced inputs, the lines are captured as "every other" line for even frames, and the skipped lines are filled in after the next VSYNC for odd frames. For non-interlaced inputs, the active array is filled with sequential lines until a complete frame is received, as indicated by a VSYNC, then the next frame is captured in the second bank 708. When that frame is captured as signaled by the next VSYNC, the capture operation returns to the first memory bank 708. In this way, video is captured as a complete frame in each bank 708 on a "ping-pong" basis, where one memory bank 708 contains the previous frame which is complete, and the other bank 708 contains the current frame, which is incomplete. Interlaced formats are identical in certain embodiments, except that two VSYNCs are used before the active memory bank 708 is changed, to allow the complete image (even and odd field) to be captured.

The DRAM controller 712 serves to control access to the DRAM array 708. The ND converter 706 writes pixel data to the DRAM array 708, and the video combining module 616 of FIG. 6 requests data from the DRAM array 708. For data writes, the DRAM controller 712 can be responsible for creating the address for each pixel, e.g., by incrementing the address for each pixel within a line, and incrementing the line count by one (for non-interlaced) or two (for interlaced) thus forming an address for each bank. The DRAM controller 712 may also count HSYNCs and monitor VSYNC and swap the active capture bank 708 when a captured frame is complete.

For reads from the video combining module 616, the memory controller 712 can read the DRAM bank 708 that contains the most recent complete frame. In one embodiment, data is presented to the video combining module 616 in non-interlaced format, synchronized to the clock from the video combiner. In this way, the DRAM controller 712 may synchronize the incoming data to the display, by using the pixel clock from the clock synthesizer to write the data into the DRAM banks 708, and the clock from the video combiner to read the data out of the DRAM banks 708.

Referring again to FIG. 6, the video receiver 614 may operate similarly to the video digitizer 612/700, except that the video data is received in a coded digital rather than an analog format. In certain embodiments, digital input sources conform to the industry standard HDMI interface. However, many possible video formats may be used, including DVI and proprietary LVDS-based signaling protocols. The video receiver need not synthesize the pixel clock in one embodiment, as this is provided by the digital video source at the input, along with HSYNC and VSYSNC signal equivalents. The video receiver 614 can capture the video data in a DRAM array in a similar fashion, storing a complete frame in an active capture bank, while presenting the previous frame to the video combiner. Rather than having an ND converter, however, the video receiver 614 may include a video decoder, which can convert the received digital video, coded in the native digital video source format, into the video format being used by the display. In the example described above with respect to FIG. 7, this would be 24-bits per pixel in an YCrCB format. The use of a video decoder allows, in certain embodiments, a variety of different digital sources to be used by ensuring that the color coding format is consistent throughout the system.

Figure 8:
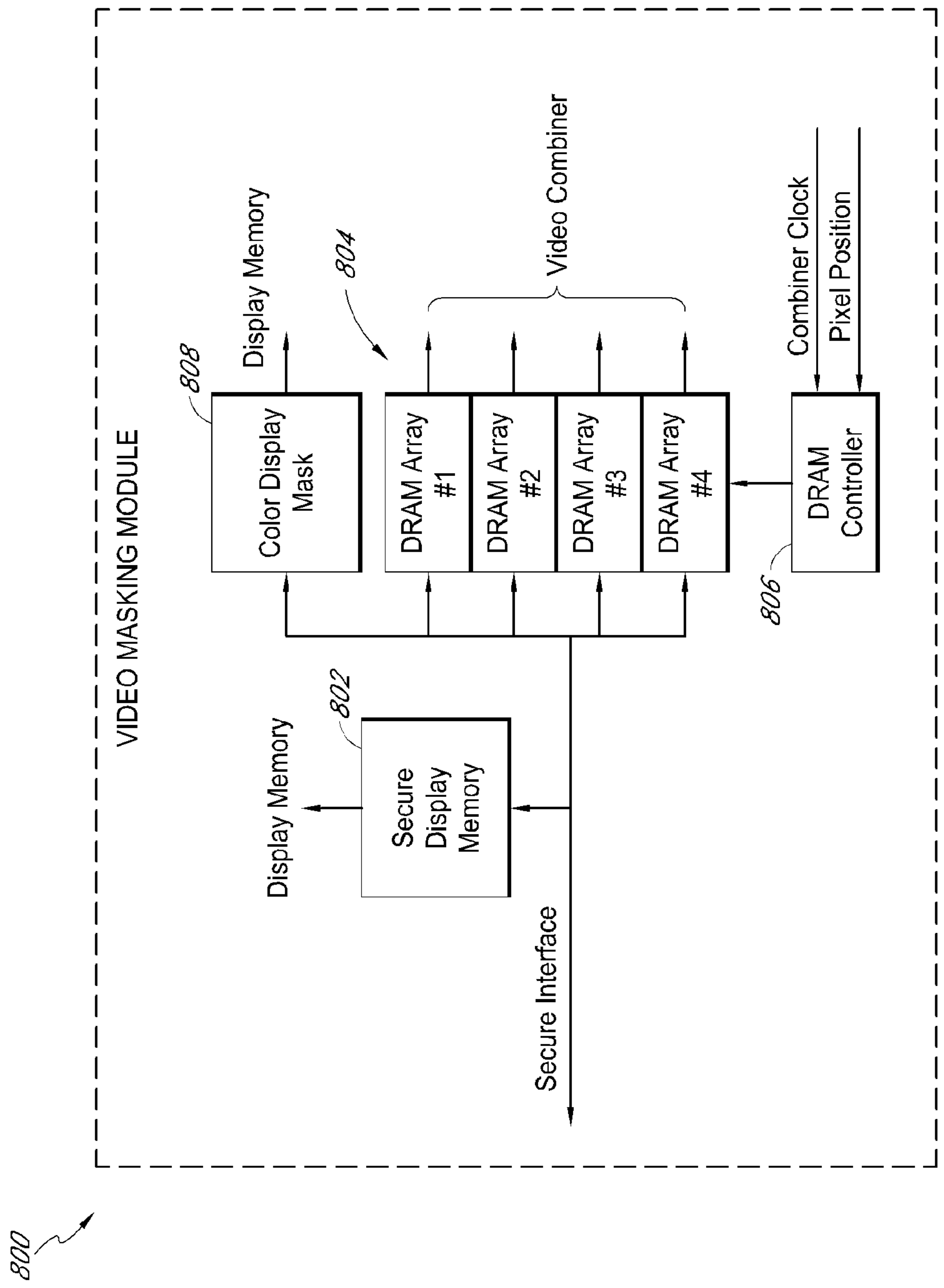
FIG. 8 is a block diagram illustrating an embodiment of a video masking module of the compositing module.

Referring to FIG. 8, a more detailed embodiment of a video masking module 800 is shown, which may have all of the functionality of the video masking module 620 described above. The video masking module 800 may include circuits enabling the wagering engine to select which image sources can have their video data displayed on the player display screen. For instance, the video masking module 800 can allow the wagering engine to select, on a pixel-by-pixel basis, whether an input image can be displayed, masked, or combined with other sources for display. In one embodiment, the video masking module 800 generates the mask that is used by the video combining module 616 to mask various video sources.

In the depicted embodiment, the video masking module 800 includes a number of DRAM banks or array masks 804, each of which contains attributes or masks for a video source, to be used by the video combining module 616 (see FIG. 6). Four array 804 mask banks are shown, but any number could be used. The video masking module 800 might, for instance, include one array mask 804 for each analog or digital video source used in the specific implementation. A secure display memory 802 for the wagering engine and a color display mask memory 808 are also provided in the example video masking module 800 shown.

The video masking module 800 also communicates with the secure interface 618 of FIG. 6, which can be a digital communications interface to the wagering engine. The secure interface 618 could be implemented in a number of ways. For instance, the secure interface 618 could be a PCI Express bus interface.

In operation, the wagering engine can initialize the DRAM banks 804, one by one, via the secure interface 618. The contents of the memory banks 804 may be read and/or written by the wagering engine through the secure interface 618 for verification purposes. Each DRAM array mask 804 includes, in one implementation, one address for each pixel position used on the display screen. Each pixel address may contain a four bit number, which can be used by the video combining module 616 to signal what weight the video source's particular pixel is to have in the composite image in that pixel position. The number of bits in each mask memory 804 could be more or less than four, allowing for more or less granularity in the intensity with which an image appears in the final composite image.

The contents of each mask 804 may be presented to the video combining module 616 in digital format as the video combining module 616 sequentially accesses each pixel in the display to form the composite image. In certain embodiments, if the mask number for pixel N is 0000b (using the four bit example, where b stands for binary), the pixel from that source has no weighting. This pixel would therefore be completely masked by the video combiner module 616 in one implementation. If the mask number for a pixel is 1111b, the pixel from that associated video source will be fully represented in the combined image in one embodiment.

In this manner, it is possible to reduce the intensity of pixels from the various sources from completely blank to completely displayed, as well as represented dimly by writing numbers between 0000b and 1111b into the mask memory 804. The contents of the mask memory 804 for each video source may be independent in both pixel and video source, meaning that each video source may have regions where it is represented, and regions where it is not. For instance, in one embodiment, by writing an array of 1111b to the pixel addresses representing the bottom 100 lines of the mask memory #2, and writing 0000b to every other address, the input video source associated with mask memory #2 can display its images on the bottom 100 lines of the screen, but no where else on the screen, regardless of what the contents of the capture memory are. In this embodiment, none of the other three input devices will have their images displayed at any point on the screen, as their mask memories 804 are cleared in all locations.

Each input source (corresponding, e.g., to an input device) may have its own mask memory 804 and can have its own attributes as to where on the screen it will have its pixels appear in the composite image. Taking our example further, if 0111b were written to the bottom 100 lines for mask memory #2, the bottom 100 lines from input video source #2 would appear, but at half intensity in one embodiment.

By manipulating the contents of the mask memory 804, each video source can be programmed by the secure interface 618 to display its contents on the composite image or have its image masked. Images may be cropped or allowed to appear in irregularly-shaped windows. By enabling every second, third, or fifth pixel in an image, for example, a “ghosting” effect can be achieved. Multiple input images can also be mixed together, allowing images from more than one source to appear on the screen in the same place at the same time, allowing a “translucent” overlay effect. A wide variety of additional possible display mixing effects is possible through manipulation of the contents of the array mask memories 804. Thus, while the attributes for each pixel are referred to herein as masks, the term “mask”, in addition to having its ordinary meaning, may also include the mixing and other pixel effects described herein.

The secure display memory 802 represents, in certain embodiments, the image to be displayed by the wagering engine. It can be a static video display frame buffer, accessible via software, that allows the wagering engine to create any arbitrary image based upon the contents of this memory. The content of the secure display memory 802 may be presented to the display memory module 622.

The video masking module 800 also includes a color display mask 808 in the depicted embodiment. Similar to the other mask arrays 804, the color display mask 808 may contain one or more color attributes or masks for each pixel position on the screen. The color display mask 808 can prevent specific colors from being displayed to the player, regardless of what video composite image is created by the video combining module 616. When programmed by the secure interface 618, the color display mask 808 may cause, for each pixel position, one or more colors to be “illegal” for display by the entertainment engine. These colors may be masked by the display memory module 622.

The ability to prevent certain colors from being displayed gives, in certain embodiments, the compositing module 630 the ability to reserve not only locations on the screen (via the array masks 804), but also certain colors anywhere on the screen (via the color display mask 808), from being displayed. This capability can allow the wagering engine to reserve, under software control, certain colors for its exclusive use in reporting game events to the players. This functionality can be useful in restricting the ability of an external video source to present certain color coded information to players.

Figure 9:
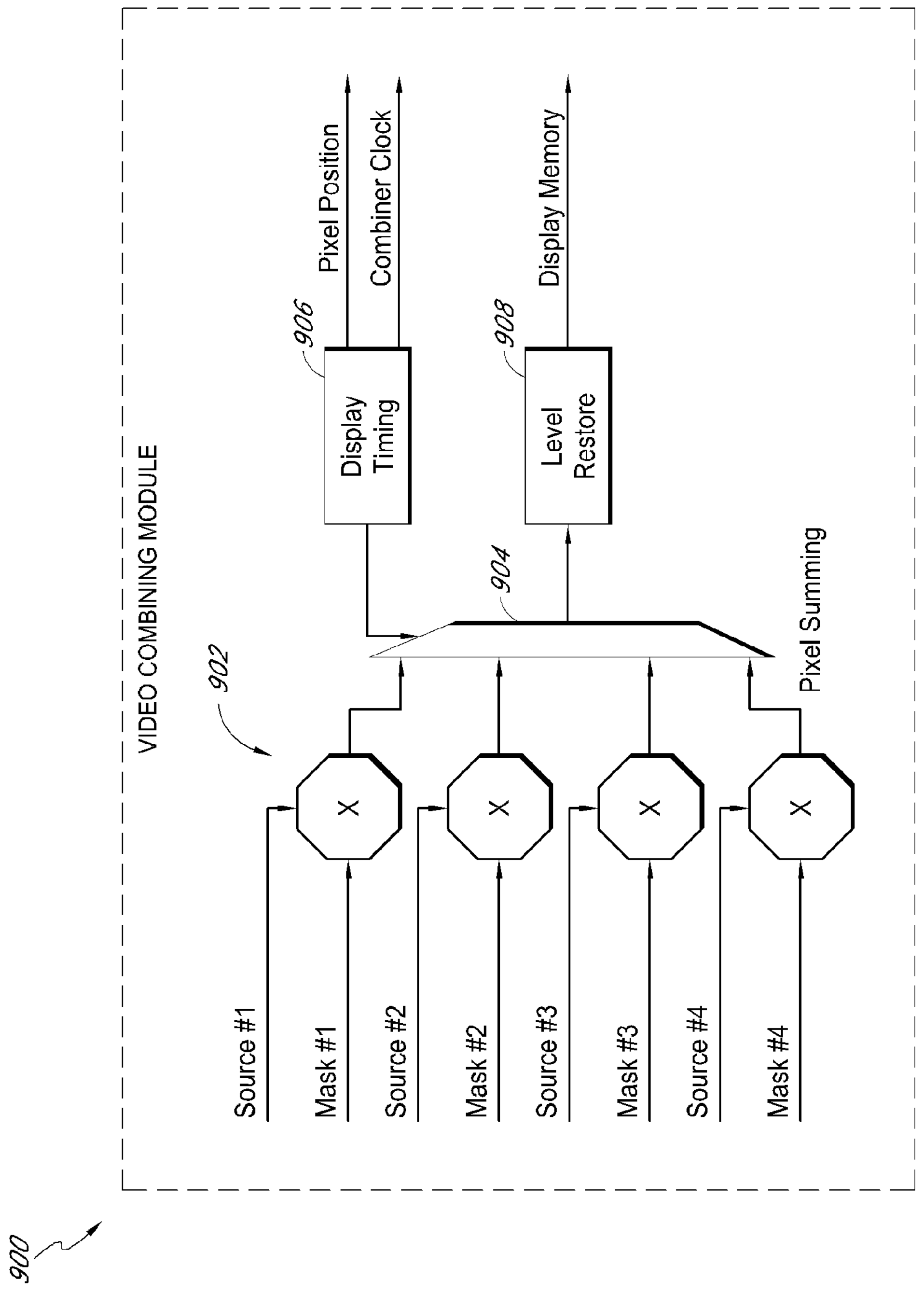
FIG. 9 is a block diagram illustrating an embodiment of a video combining module of the compositing module.

FIG. 9 illustrates a more detailed embodiment of a video combining module 900, which may have all of the functionality of the video combining module 616 described above. The video combining module 900 shown receives four independent video sources from either an analog video input or a digital video receiver block. The number of video sources shown is merely exemplary, and other numbers of inputs could also be implemented.

The video combining module 900 includes a display timing module 906 that produces a pixel clock and a pixel position signal, used by other modules in the compositing module 630 to ensure that each module creates the required pixel for processing at the correct moment in time, and each block knows which pixel on the display is being processed at the moment.

With each pixel clock, the contents of the video information from the analog or digital sources (numbered source #1 through #4 in the diagram) and the corresponding pixel mask data from the video masking module 620 are combined by digital multipliers 902. Four multipliers 902 are shown, corresponding to the four sources. Other numbers of multipliers 902 may also be provided. The multipliers 902 decode pixel intensity values from each video source and multiply each pixel value and its mask or attribute, pixel by pixel. In one embodiment, when the video data pixel or the mask data are zero, the output of a multiplier 902 is zero, resulting in zero intensity for that pixel. When the mask value and the pixel data are non-zero values, the multiplier 902 outputs non-zero values, resulting in varying amounts of intensity for the pixels.

The output of each multiplier 902 is summed by a pixel summing circuit 904. The summed pixel value represents in one embodiment the total contribution of each of the four sources, represented in a digital format. The summing circuit 904 may be capable of decoding the digital representation of each multiplier 902 output such that the summation of all four sources will result in a new color code, representing a composite color of the pixel. The summed value is then provided to a level restore circuit 908, which can level restore the pixel based upon the full scale bright maximum value for that pixel (if available). In other words, the level restore circuit 908 can reduce the brightness or intensity of the pixel that may have increased due to the summing of multiple pixels. The level restore circuit 908 may also convert the pixel back into a format suitable for storage as a coded pixel.

The coded mathematical sum for each pixel can be presented to the display memory module 622. The pixel result presented in certain embodiments is the mask-weighted, mathematically averaged sum of all of the input block video pixels.

Figure 10:
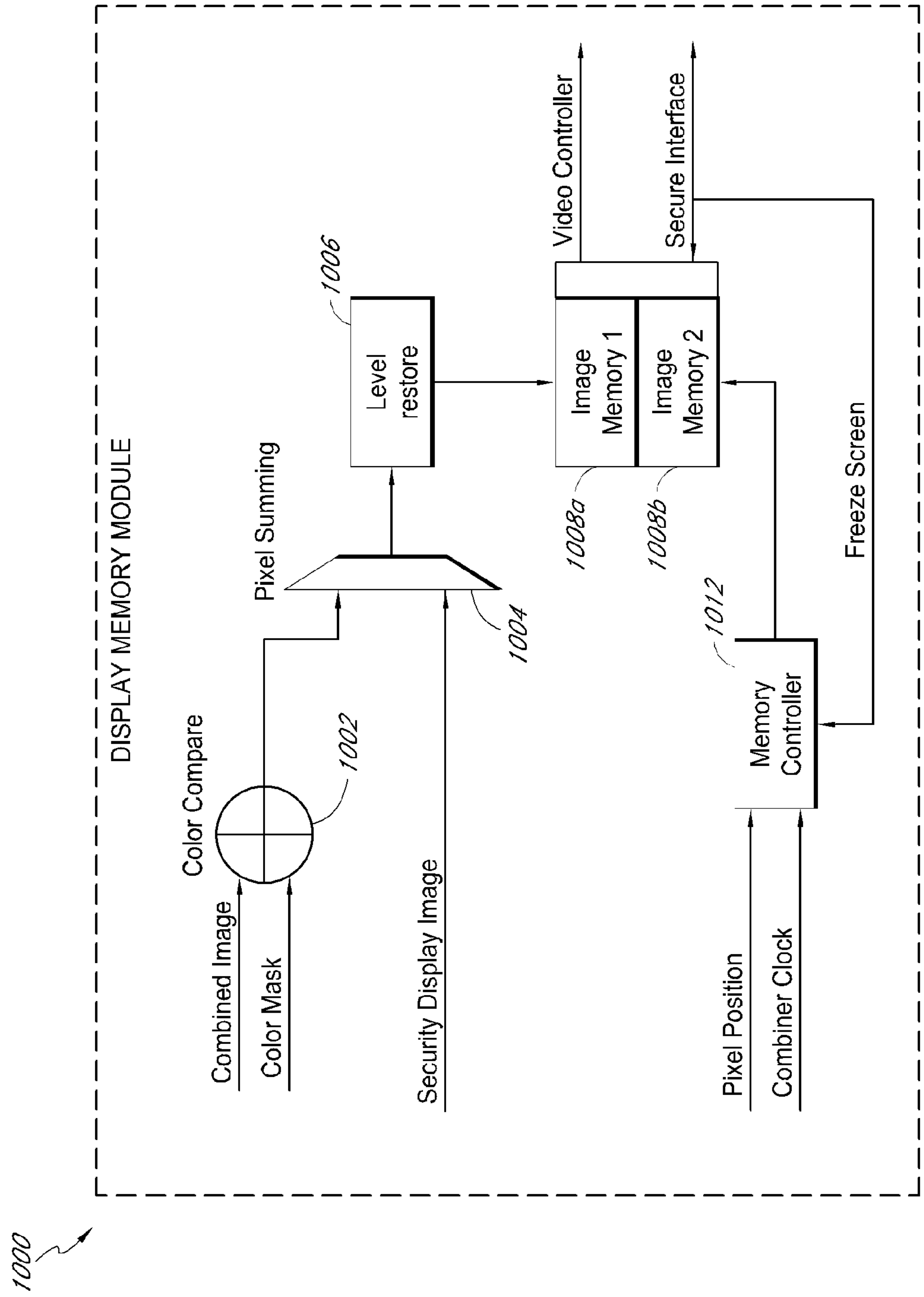
FIG. 10 is a block diagram illustrating an embodiment of a display memory module of the compositing module.

FIG. 10 illustrates a more detailed embodiment of a display memory module 1000, which may have all of the functionality of the display memory module 622 described above.

The display memory module 1000 includes a color comparison circuit 1002 for masking the combined image from the video combining module 616, 900 with a color mask (see FIG. 8). The color comparison circuit 1002 compares the image from the video combining module 616, 900 with the contents of the color mask on a pixel-by-pixel basis. This optional compare function is used in certain embodiments to verify that no pixel carries the same color code as those specified in the color mask memory. If a color from the combined image matches the color(s) specified for that pixel position in the color mask memory, then that pixel may be "modified" to a color which is near, but distinguishable from the masked color. Thus, color compare circuit 1002 can digitally compare the input pixel with the color mask contents, and modify the input pixel where the colors match.

The display memory module 1000 also includes a summer circuit 1004 for summing the output of the color comparison circuit 1002 with the secure display image from the wagering engine. This image is then provided to a level restore circuit 1006, which may have similar functionality as described above with respect to FIG. 9. This final image, which now includes the unmasked and unmodified contents of the secure display image, along with the composite image from the combiner, represents the final image to be displayed to the player.

The final image is transmitted, pixel by pixel, to an image memory block 1008. As with operation in the video digitizer 612, 700, the image memory is divided into two banks 1008*a*, 1008*b*. One bank 1008 is actively capturing a current frame, and the other bank 1008 contains the most recent complete frame. When a captured image is complete, and an entire frame is valid, a memory controller 1012 switches capture to the previous frame bank 1008, and overwrites the bank 1008 with data from the next frame. The contents of the image memory bank 1008 therefore represent the last array of pixels that constitute a complete frame shown on the user display, as well as the frame currently being displayed to the player. The associated memory controller 1012 can provide the completed images to the video controller 624.

The image memory block 1008 can also be accessed by the secure interface 618 to capture the final displayed image for storage, auditing, and verification purposes. The secure interface 618 can read and write the image memory 1008 contents under software control, allowing the wagering engine to read the contents of the displayed image and store it in the secure storage for verification purposes. The secure interface 618 is also able to command the image memory to stop capturing image data in certain embodiments to allow the wagering engine to freeze the update of the display. In such circumstances, software in the wagering engine, for instance, is able to stop any update to the screen for any arbitrary period of time under program control. This feature may allow a player time to recognize images for longer periods of time than normally available with moving images. This capability may also allow players to verify key gaming events such as player choices and game outcomes, without potential distraction of movement of the images on the screen.

The ability to freeze the screen also allows the secure interface 618 to copy the displayed image into the secure storage in certain embodiments. Concurrently, it is possible for the wagering engine to examine the displayed image under software control. Such examination could include verification that secure images were created and displayed correctly and that no fault has occurred in the operation of the overall video compositor system. This ability may be useful for test and verification purposes as well as verification of screens displayed to players.

Referring again to FIG. 6, the video controller 624 can be responsible for the conversion of the contents of the image memory 1008 of FIG. 10 to a format suitable for the player display device. In one embodiment, the video controller 624 will contain timing and buffer circuits to allow the video display data to be transmitted to a flat panel or other display by means of an HDMI interface. However, many different video controller output circuits are possible, which may, for example, provide LVDS-style video signals for an LCD panel or analog signals for a CRT-type display.

Figure 11:
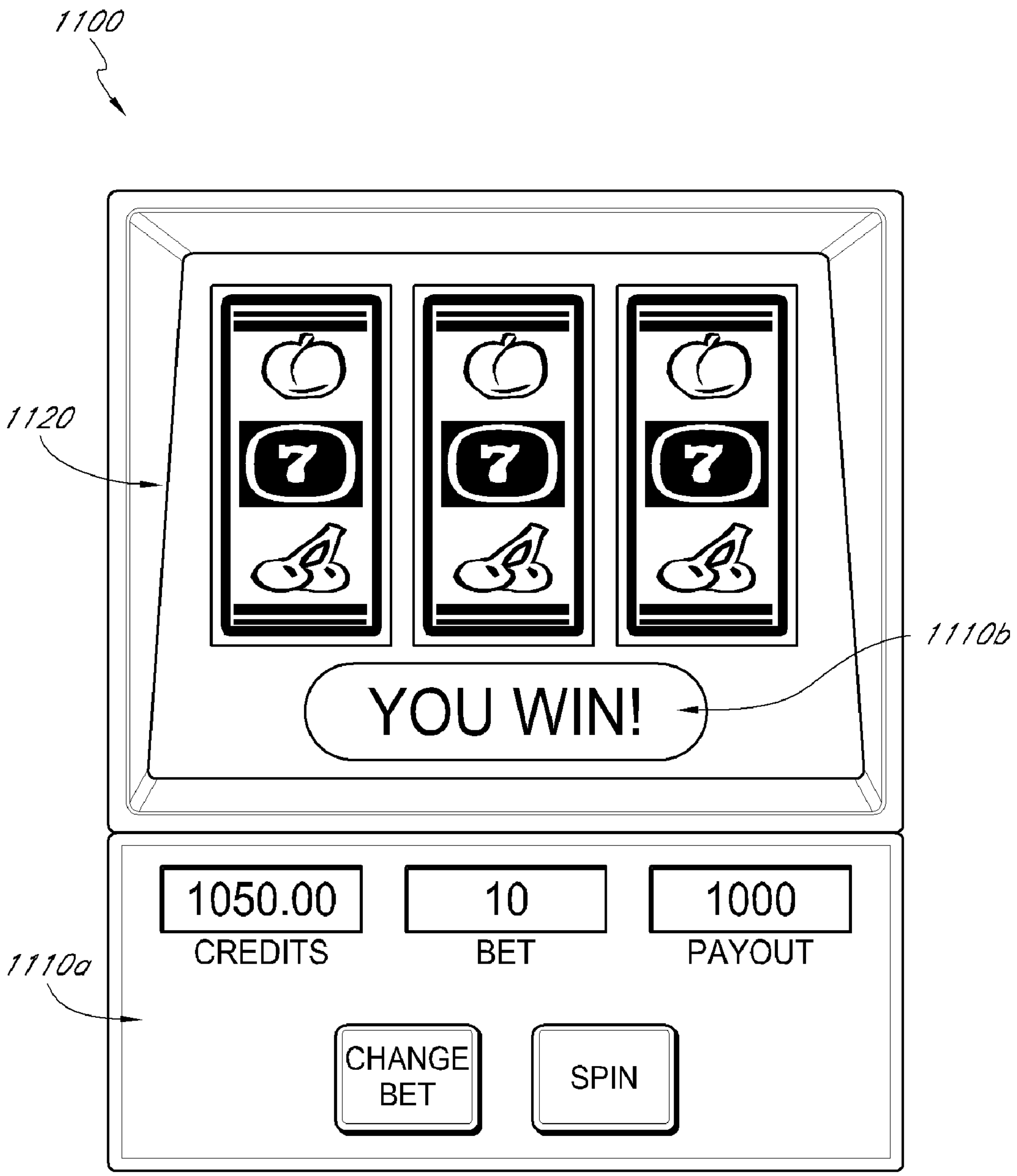
FIG. 11 is a screen shot illustrating a simplified example of a display that may be generated by the compositing module.

FIG. 11 illustrates a screen shot 1100 of a simplified example display that may be generated by any of the compositing modules described above, including the compositing modules 130, 230, 530, and 630. The screen shot 1100 includes entertainment engine content 1120 and wagering engine content 1110. The entertainment engine content 1120 includes a slot machine display, which is shown with simple graphics for ease of illustration. The wagering engine content 1110 includes example wagering functions 1110*a* such as changing a bet, credits displayed, payout displayed, and so forth. The wagering engine content 1110 also includes a "you win" notification 1110*b*. In the depicted embodiment, portions of the wagering engine content 1110*b* are superimposed over portions of the entertainment engine content 1120. This superposition can be created by applying masks of 0000b, for instance, to the entertainment engine content 1120 for the pixels displayed by the wagering engine content 1110*b*.

Figure 12:
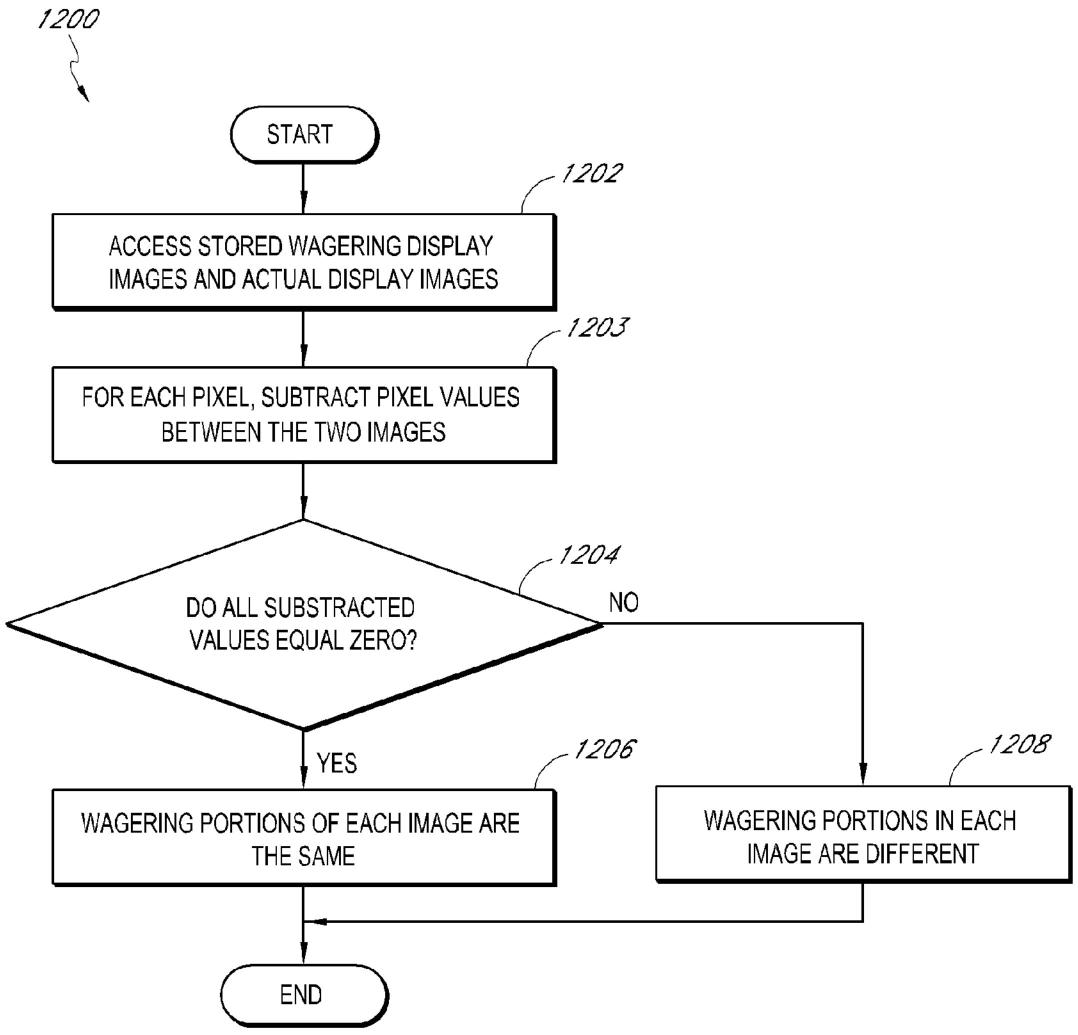
FIG. 12 is flow diagram illustrating an embodiment of an image validator process.

FIG. 12 illustrates an example process 1200 for validating the output of the wagering engine. The process 1200 may be implemented by the wagering engine 110 or 210. More particularly, the process 1200 may be implemented by the image validator 219 of FIG. 2. The process 1200 advantageously allows, in certain embodiments, wagering engine display output to be compared with actual display output, to facilitate regulatory testing, dispute resolution, and the like. The process 1200 may be performed in real-time or near-real time, as images are provided to the video controller 624. Alternatively, the process 1200 may be performed after a game of chance has completed.

At block 1202, stored wagering display images and actual display images are accessed, for example, from the storage device 150 or 250. Alternatively, both images may be obtained directly from the display memory module 622, 1000, or the wagering display image may be obtained from the video masking module 800, prior to storage.

At block 1203, pixel values are subtracted between the two images, for each pixel value corresponding to the wagering display image. Thus, values of the pixels in the actual display image that correspond to the pixels in the wagering display image may be subtracted from (or otherwise compared with) the values of pixels in the wagering display image. Instead of subtracting or comparing pixels, in some embodiments, entire regions of pixels may be subtracted.

It is determined at decision block 1204 whether all the subtracted values are zero, or substantially zero. In one embodiment, if all of the values are zero or substantially zero, the wagering portions of each image are considered the same at block 1206. The wagering engine may therefore determine that the correct image was displayed.

In contrast, if any of the subtracted pixel values are not zero (or substantially zero in some implementations), then the wagering portions in each image are considered to be different at block 1208. The wagering engine might therefore conclude that the incorrect image was displayed and may infer that tampering or malfunction has occurred. In response, the wagering engine may, for example, log an error message and shut down the gaming system.

In some embodiments, the process 1200 may also be used by an external auditing device operated by a regulator or auditor. The external auditing device, as described above, may be placed into communication with the secure storage repository of FIG. 2. The external auditing device may use the pixel comparison techniques of the process 1200 to determine whether the output from the wagering engine was correctly displayed on a player display.

The various blocks and modules of the systems described herein can be implemented as software applications, hardware and/or software modules, or components on one or more computers, such as servers. While the various modules are illustrated separately, they may share some or all of the same underlying logic or code. In addition, each of the processes, components, and algorithms described above may also be embodied in, and fully automated by, modules executed by one or more computers or computer processors. The modules may be stored on any type of computer-readable medium or computer storage device. In addition, in some embodiments, certain processes, components, and algorithms described herein may be implemented monolithically.

The processes and algorithms may also be implemented partially or wholly in application-specific circuitry. The results of the disclosed processes and process states may be stored, persistently or otherwise, in any type of computer storage. In one embodiment, the modules may be configured to execute on one or more processors, including sub-processors. In addition, the modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process blocks or states may be omitted in some implementations. The methods and processes described herein are also not limited to any particular sequence, and the blocks, states, or states relating thereto can be performed in other sequences that are appropriate. For example, described blocks, states, or states may be performed in an order other than that specifically disclosed, or multiple blocks, states, or states may be combined in a single block, state, or state.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A compositing apparatus having electronic circuitry for combining images of an electronic game of chance, the compositing apparatus comprising:

a masking module comprising electronic circuitry operative to:

receive wagering display information from a wagering engine, the wagering display information being related at least partly to wagering aspects of an electronic game of chance;

receiving entertainment display information from an entertainment engine, the entertainment display information being related to non-wagering aspects of the electronic game of chance; and receive masking information from the wagering engine;

a combining module comprising electronic circuitry operative to:

receive at least a portion of the entertainment display information and the masking information; and combine the masking information with at least a portion of the entertainment display information to produce masked display information, the masking information configured to selectively overwrite at least a portion of the entertainment display information with at least a portion of the wagering display information, thereby enabling the wagering display information to be communicated to the player regardless of the operation of the entertainment engine; and a display module comprising electronic circuitry operative to:

receive the wagering display information and the masked display information;

combine the wagering display information and the masked display information to produce combined display information; and cause the combined display information to be made available for presentation to a player.

2. The compositing apparatus of claim 1, wherein the display module is further operative to cause the combined display information to be made available for storage in a physical storage device.

3. The compositing apparatus of claim 1, wherein the display module is further operative to combine the combined display information with a color mask.

4. The compositing apparatus of claim 1, wherein the combining module is further operative to combine the masking information with at least a portion of the entertainment display information to produce masked display information by applying the masking information to one or more pixels of the entertainment display information.

5. A method for combining images of an electronic game of chance, the method comprising:

receiving wagering display information from a wagering engine, the wagering display information being related at least partly to wagering aspects of an electronic game of chance;

receiving entertainment display information from an entertainment engine, the entertainment display information being related to non-wagering aspects of the electronic game of chance;

receiving masking information from the wagering engine;

receiving at least a portion of the entertainment display information and the masking information;

combining the masking information with at least a portion of the entertainment display information to produce masked display information, the masking information configured to selectively overwrite at least a portion of the entertainment display information with at least a portion of the wagering display information, thereby enabling the wagering display information to be communicated to the player regardless of the operation of the entertainment engine;

receiving the wagering display information and the masked display information;

combining, with electronic hardware, the wagering display information and the masked display information to produce combined display information; and causing the combined display information to be made available for presentation to a player.

6. The method of claim 5, further comprising causing the combined display information to be made available for storage in a physical storage device.

7. The method of claim 5, wherein the masking information comprises an intensity mask.

8. The method of claim 5, wherein the masking information comprises a color mask.

9. A computer-implemented method of providing content for an electronic game of chance, the method comprising:

providing an electronic game of chance with an entertainment engine, the electronic game of chance operative to be played by one or more players, the entertainment engine operative to control at least some aspects of the game of chance that are not related to wagering;

providing wagering aspects of the electronic game of chance with a wagering engine;

providing wagering display information with the wagering engine;

providing entertainment display information with the entertainment engine;

programmatically combining, with electronic hardware, the wagering display information and the entertainment display information to produce combined display information, said combining comprising selectively overwriting at least a portion of the entertainment display information with at least a portion of the wagering display information, thereby enabling the wagering display information to be communicated to the player regardless of the operation of the entertainment engine; and outputting the combined display information for display to the one or more players.

10. The method of claim 9, further comprising storing the composited display information in a storage device, the storage device comprising physical storage.

11. The method of claim 10, further comprising comparing the wagering display information to the combined display information stored in the storage device to determine whether the wagering display information matches at least portions of the combined display information.

12. The method of claim 9, further comprising comparing the wagering display information to the combined display information to determine whether the wagering display information matches at least portions of the combined display information.

13. The method of claim 9, wherein programmatically combining the wagering display information and the entertainment display information comprises combining at least a portion of the entertainment display information with masking information.

14. The method of claim 9, wherein the masking information comprises pixel intensity masking information.

15. The method of claim 9, wherein the masking information comprises pixel color masking information.

16. A system for automatically auditing an electronic gaming device, the system comprising:

an entertainment engine operative to provide an electronic game of chance, the entertainment module providing entertainment display information;

a wagering engine comprising electronic hardware, the wagering engine operative to control at least wagering aspects of the game of chance to thereby enable the entertainment engine to be subject to less regulation than the wagering engine, the wagering engine providing wagering display information; and a compositing module operative to:

combine the wagering display information and the entertainment display information to produce composited display information, and output the composited display information for display to a player;

the wagering engine further operative to cause the compositing module to selectively overwrite at least a portion of the entertainment display information with at least a portion of the wagering display information, thereby enabling the wagering displaying information to be communicated to the player regardless of the operation of the entertainment engine.

17. The system of claim 16, further comprising a validator module operative to automatically compare the wagering display information to the combined display information to determine whether the wagering display information matches at least part of the combined display information.

18. The system of claim 17, wherein the validator module is further operative to compare the wagering display information to the combined display information by comparing differences in pixel values between the wagering display information and the combined display information.

19. The system of claim 17, wherein the validator module is further operative to determine that the wagering display information and the combined display information include the same wagering information by determining that there are substantially no differences between the pixel values.

20. A system for providing content for an electronic game of chance, the system comprising:

an entertainment engine operative to provide an electronic game of chance for use by a player, the entertainment module providing entertainment content to the player;

a wagering engine operative to control at least wagering aspects of the game of chance, such that the wagering engine is configured to process a wagering event and broadcast a message to the entertainment engine regarding the wagering event, wherein the wagering engine broadcasts the message without seeking a response from the entertainment engine;

the entertainment engine operative to provide at least a portion of the entertainment content to the player in response to receiving the message regarding the wagering event; and the wagering engine further operative to output information related to the wagering event for presentation to the player, independent of whether the wagering engine receives a completion message from the entertainment engine that indicates that the entertainment engine has provided the entertainment content, such that the wagering engine is further operative to cause at least a portion of the entertainment display information to be masked with at least a portion of the wagering display information, thereby enabling the wagering display information to be communicated to the player regardless of the operation of the entertainment engine.

21. The system of claim 20, wherein the wagering engine is further operative to output information related to the wagering event for presentation to the player in response to receiving the completion message from the entertainment engine.

22. The system of claim 20, wherein the wagering engine is further operative to access a timer to determine whether the entertainment content has exceeded a predetermined time.

23. The system of claim 22, wherein the wagering engine is operative to output information related to the wagering event for presentation to the player in response to the entertainment content exceeding the predetermined time.

24. The system of claim 20, wherein the wagering event comprises at least one of the following: accepting payment, updating credits, accepting a wager, updating a wager amount, receiving a player input, starting a wager, calculating a wager result, outputting a wager result, and paying out credits.

25. The system of claim 20, wherein one or both of the wagering engine and the entertainment engine are implemented by one or more computer systems comprising physical computer hardware.

26. A system for automatically auditing an electronic gaming device, the system comprising:

an entertainment engine operative to provide an electronic game of chance, the entertainment module providing entertainment display information;

a wagering engine comprising electronic hardware, the wagering engine operative to control at least wagering aspects of the game of chance to thereby enable the entertainment engine to be subject to less regulation than the wagering engine, the wagering engine providing wagering display information;

a compositing module operative to:

combine the wagering display information and the entertainment display information to produce composited display information, and output the composited display information for display to a player; and a validator module operative to automatically compare the wagering display information to the combined display information to determine whether the wagering display information matches at least part of the combined display information.

27. The system of claim 25, wherein the validator module is further operative to compare the wagering display information to the combined display information by comparing differences in pixel values between the wagering display information and the combined display information.

28. The system of claim 25, wherein the validator module is further operative to determine that the wagering display information and the combined display information include the same wagering information by determining that there are substantially no differences between the pixel values.

* * * * *